Feb. 19, 1957   E. R. VAN KREVELEN   2,782,400
CODE TELEMETERING
Filed May 18, 1953   3 Sheets-Sheet 1
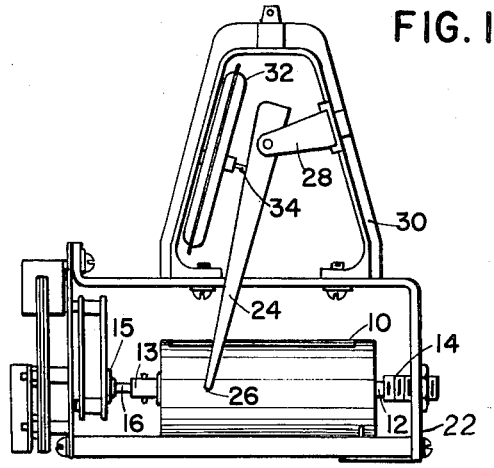
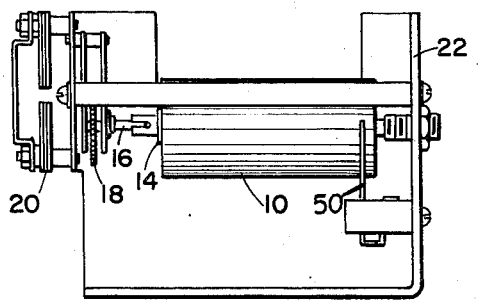
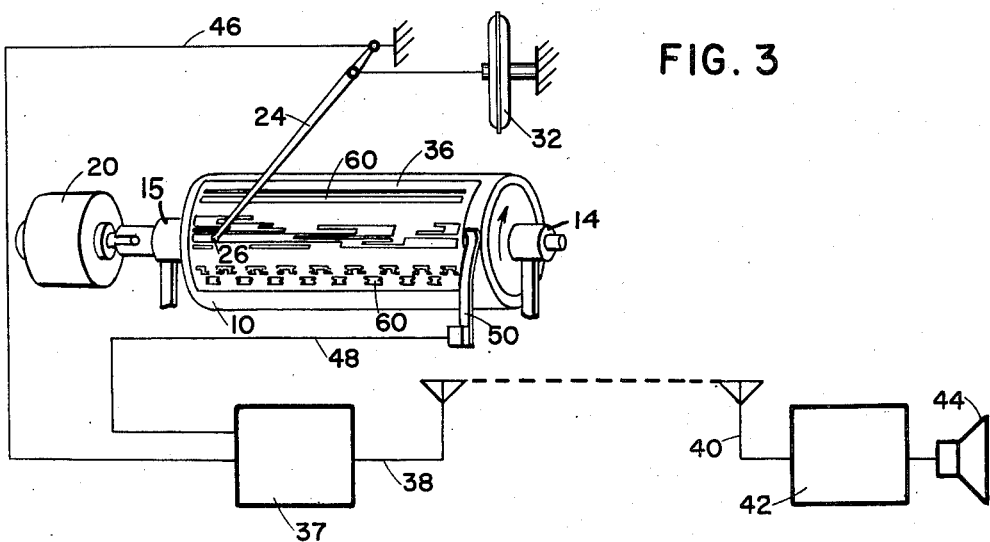
INVENTOR
EDWARD R. VAN KREVELEN
BY William C. Stueber ATTORNEY Feb. 19, 1957  E. R. VAN KREVELEN  2,782,400
CODE TELEMETERING
Filed May 18, 1953  3 Sheets-Sheet 2
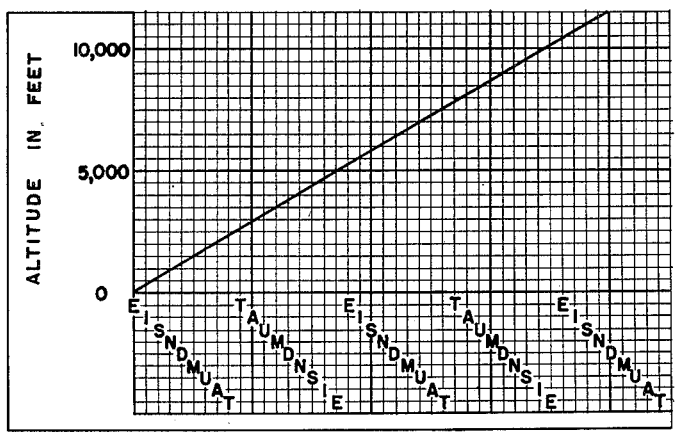
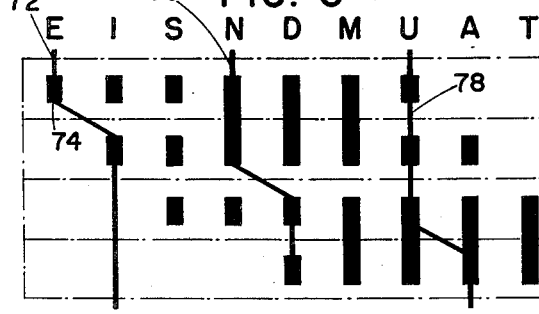
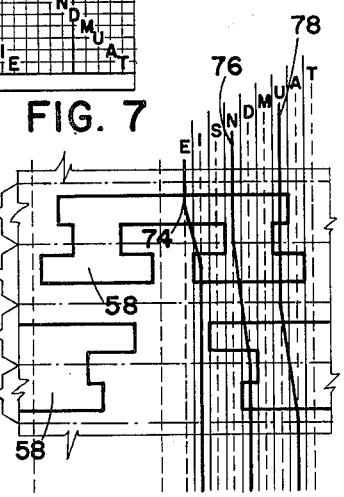
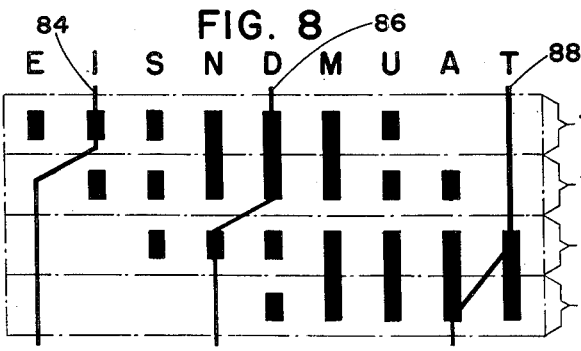
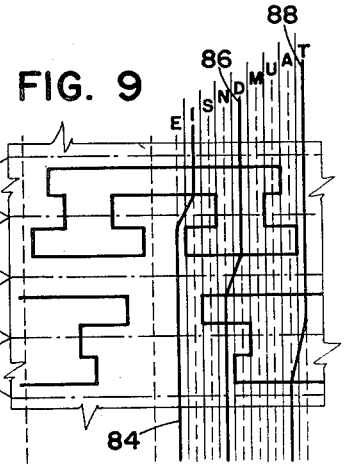
INVENTOR
EDWARD R. VAN KREVLEN
BY *William C. Stueber* ATTORNEY United States Patent Office 2,782,400
Patented Feb. 19, 1957

2,782,400

CODE TELEMETERING

Edward R. Van Krevelen, Robbinsdale, Minn., assignor to General Mills, Inc., a corporation of Delaware Application May 18, 1953, Serial No. 355,555

10 Claims. (Cl. 340—204)

This invention relates to improvements in telemetering and more specifically to improvements in apparatus which transmits a code signal indicative of a measurement wherein the signal is formulated by an electrical circuit closed by a contact arm engaging conducting segments embedded in a non-conducting surface.

The present invention presents a telemetering device wherein measurements may be transmitted to a point remote from the location where they are measured. In one method of telemetering signals, a certain code signal is formed for one measurement, a different code signal being formulated for each different measurement. Thus the observer, by noting the signal sent, will have knowledge of the measurement. In the present invention a cylindrically shaped code drum is ordinarily used with a contact arm riding on the surface of the drum. The drum has a non-conducting surface with conducting segments embedded in the surface. These segments and the contact arm are in the telemetering circuit and when the contact arm engages a segment the circuit is closed to send a signal. As the drum rotates an arm rides over a series of the segments and intermittent signals are generated which as a group form a code symbol or letter. Different numbers of segments and different lengths are arranged along the drum so that at different positions of the arm different code symbols are formed.

In apparatus of this type, limitations are encountered in that within the limits of a drum of a practical size, only a certain number of code signals can be used. The number of measurements telemetered are limited by the number of signals which can be arranged along the drum.

Another limitation encountered in this type of drum occurs when the contact arm moves longitudinally along the drum's surface in the middle of a code signal. The signal is often garbled and unreadable and often a false reading is given.

Accordingly, it is an object of the present invention to provide a telemetering system employing a code drum and a contact arm for sending a telemetering signal wherein the chance of error in code symbol is greatly diminished and an accurate signal will be transmitted regardless of the fact that the arm may be moving along the drum from one code signal to another during the generation of the symbol.

Another object of the invention is to provide a method of arranging the code signals on the surface of the code drum in a manner so that very large numbers of code letter changes may be arranged in a relatively small length of drum, thus enhancing the accuracy of the measurements telemetered.

A still further object of the invention is to provide a telemeter apparatus employing a contact arm and code drum wherein the drum may be constructed with a very large number of code signals embedded in its surface and the construction may be relatively easily constructed and economical.

Another object of the invention is to provide an apparatus which very accurately telemeters minute changes in pressure and which is practical for a multiplicity of uses including utilization means for telemetering pressure readings from a balloon.

Other objects and advantages will become apparent in the following specification taken in connection with the drawings in which:

Figure 1 is a plan view of the apparatus employing the improved telemetering code apparatus;

Fig. 2 is an elevational view of the apparatus of Fig. 1;

Fig. 3 is a schematic diagram of the apparatus and the circuit employed in the improved code telemetering apparatus, illustrating the manner in which the device may be used to telemeter pressure changes by radio;

Fig. 5 is a graph having the telemetered code letters plotted against altitude, illustrating how the described embodiment might be used in an altitude telemetering device.

Fig. 6 is a pictorial representation of the arrangement of code letters across a small portion of the code drum, the letters being spread out for ease of explanation;

Fig. 7 shows the same letters as Fig. 6, with the contact areas as they actually appear on the drum surface, both figures being presented to illustrate the possible path of movement of the contact arm if it changes position while generating a code letter;

Fig. 8 is a pictorial representation of the sequence of code figures across a small portion of the code drum with the letters spread out for ease of explanation, and;

Fig. 9 is again the actual representation of the conducting areas of Fig. 8, these figures being shown to represent possible movement of the contact arm changing position while generating a letter but in the opposite direction of the arm of Figs. 6 and 7.

Figure 4:
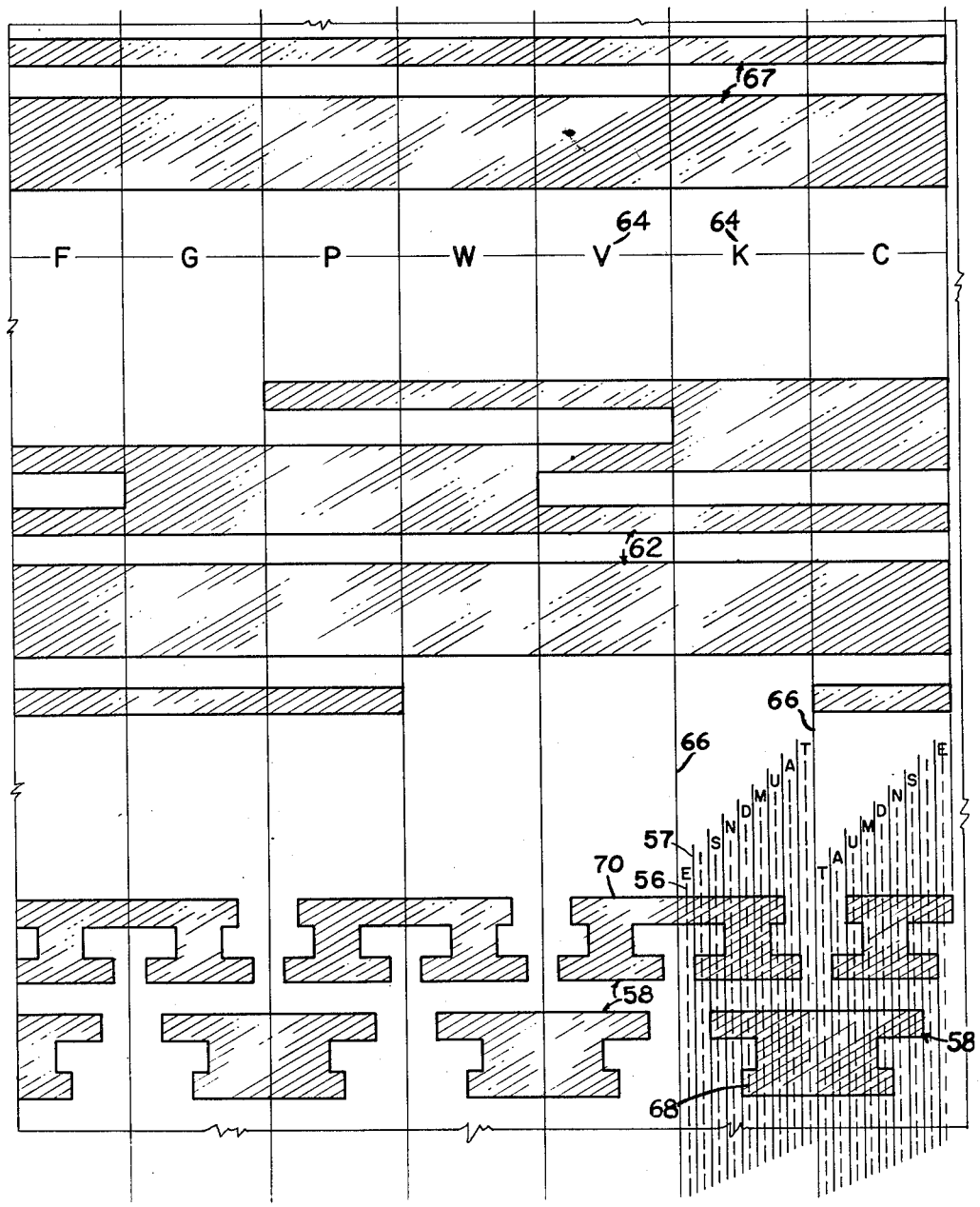
Fig. 4 is a plan view of a portion of the surface of the code drum.

In Figs. 1 and 2 an embodiment of the present invention is shown as it may be used with an apparatus for telemetering pressure measurements. The device shown is suitable, for example, for telemetering air pressure from a balloon in flight which may be read in terms of balloon altitude.

In telemetering, various types of signs have been used for telemetering a measurement or a change in condition. There are many advantages, however, which accrue to a code type of signal. One of these advantages is the fact that with changes in condition, a very distinctive change can be made in the signal transmitted since a completely different code signal can be sent. A distinct change in code signal is easily interpreted by even an inexperienced observer and can be made sufficiently distinct to cancel any doubt of a change having occurred.

In a telemetering apparatus which is pressure-responsive such as is shown, a small change in pressure can be arranged to change the code letter transmitted. When used in a balloon a change in altitude will be clearly telemetered.

In Figs. 1 and 2, a code drum 10 is shown supported for rotation on suitable supporting trunnions 12 and 13 supported in bearings 14 and 15. The trunnion 13 on the left hand of the drum may be slotted to receive a drive shaft 16 which is suitably rotated through a succession of gears 18 rotated by a slow speed motor 20. When the motor rotates at a constant speed, the code drum 10 is also rotated. The code drum and motor are supported in a suitable frame 22.

A contact arm 24 is provided which carries on its tip a contact point 26 bearing on the surface of the code cylinder. The contact arm is pivotally supported at its base on a bracket 28 which is carried on an A frame 30 which is secured to the main frame 22. Also mounted on the A frame is a pressure-responsive bellows 32 which has a link 34 connecting it to the pivotal contact arm 24. Expansion or contraction of the bellows 32 with a change in pressure causes the reciprocation of the link 34 and a consequent pivotal movement of the contact arm 24. This pivotal movement carries the contact point 26 back and forth across the surface of the code drum. Since the code drum rotates constantly, the friction between the contact point and the code drum will be kept low and the contact point will slide easily as the arm pivots.

The arrangement is shown schematically in Fig. 3. To generate a signal which corresponds to the position of the contact point, the drum surface carries a number of specially shaped conducting areas 60. These areas, as shown in the preferred embodiment, are embedded in a non-conducting material 36 which is set into the drum and conforms to its cylindrical surface.

It will be readily seen from the diagram of Fig. 3, that as contact point 26 engages a contact area within the area 36 the circuit through the contact point will be completed. The telemetering circuit which is to be completed closes through a suitable radio transmitter shown schematically at 37 having an antenna 38. The signals generated normally are modulated to radio frequency, are transmitted and received by the distant antenna 40, and are converted into audio signals which may be received by the radio receiver 42 shown having a speaker 44. In this arrangement, each time the circuit is closed by the contact point engaging a conducting area, an audio frequency signal is transmitted and received by the receiver and issued through the loudspeaker. The closing of the circuit occurs in short and long sequences forming dots and dashes and can be in form of code such as International Morse Code.

To complete the circuit to the transmitter 37 from the contact arm 24, a lead 46 leads to the transmitter and another lead 48 leads to the transmitter from a fixed contact arm 50. This fixed contact arm rides on the code drum body 10 which is of conducting material and is electrically connected to each one of the conducting areas embedded in the surface of the non-conducting material 36.

The non-conducting material is a substance such as Micarta which is resistant to abrasion. The conducting areas are embedded in the non-conducting surface of the drum so as to be flush with the surface and not offer resistance to the contact arm as the drum rotates beneath it.

An important feature of the invention lies in the arrangement and shape of the conducting areas in the surface of the code drum. In Fig. 4 is shown an area arrangement following the principles of the present invention.

For purposes of the present disclosure, the code symbols which are generated are Morse Code although other suitable codes could be used. The sequence of letters forming the code is printed in Fig. 4 with the conducting areas 60 which form the letters being shaded and the insulated non-conducting or insulated areas 60 unshaded. The dotted lines 56 drawn through the conducting areas represent the possible paths of travel of the contact point as the code drum rotates. The short solid lines 57 indicate the boundary between the different letters. Shown at the bottom of Fig. 4 are the conducting areas 58 which form the main code letters indicating fine measurements. Arranged ahead of the areas 58 are additional conducting areas 62 which form the prefix letters. These prefix letters change for each group of main code letters and identify which of the group of main code letters the device is telemetering. Each different group of main code letters has a separate prefix letter, the prefix letters being indicated at 64. The boundaries of the prefix letters, which also indicate the boundaries of the groups of the main code letters are shown separated by the vertical lines 66 extending the length of the drawing ahead of the main code letters and also ahead of the prefix letter is an identifying letter 67 which extends fully across the code drum. In case several code drums are in simultaneous operation, this identifying letter will inform the observer as to which of the signals he is reading. In the embodiment shown the identifying letter is a dot followed by a dash, or an "A" in Morse code.

It is to be particularly noted that the main conducting areas 58 are not formed in small divided discrete areas but are formed of continuous areas or block areas. There are important advantages to this shaping, one of which is the fact that each conformation of a given area serves not only one letter but a plurality of letters. An even more important feature is that when the areas are shaped in accordance with the teachings of my invention, the contact point may change position while forming a code letter and will continue to form a letter which is one of the two letters it is moving between. Thus a clear code letter is generated and the observer will not read an erroneous signal.

As a further advantage, it is to be noted with reference to the drawings, that the large main conducting areas 58 serve the two adjacent groups of letters. That is, for example, the conducting area 68 serves the group of letters which have the prefix "K" and also the letters which have the prefix "C." The same may be said of the conducting area 70 which serves the sequence of letters having the prefix "V" and also the sequence of letters having the prefix "K." Since the groups consist of the same sequence of letters and the sequence is alternately reversed, the conducting area for the prefix letter is symmetrical about a line dividing the groups.

Thus it will be seen in brief summary of the above, that the main code letters along the code drum consist of sequences of letters which are arranged in groups, the groups being alternately reversed and repeated along the drum. Each group is identified by a different prefix code signal so that the receiver may know which group is being sent.

In the preferred embodiment shown herein the code symbols are so arranged to form groups which have the sequence of letters according to the Morse code, E, I, S, N, D, M, A, U, T. Every other group has the same letters in reverse sequence.

An important feature of the invention, which is made possible by the particular arrangement of shape and areas to form the code letter, is that the contact point may move from one letter to the next during the time it is transmitting the letter and may do this without creating an erroneous signal. In normal operation, the code drum will be rotating and the contact point passing over the conducting areas to generate a code signal. During that time a pressure change may occur causing the contact point to move from one letter to another. This is accomplished without chance of error since the letter generated will be either the letter which the contact point has just left or the new letter which it is entering upon.

In illustration of this principle, Figs. 6, 7, 8 and 9 are shown. Fig. 6 shows the sequence of letters in one of the groups on the code drum as spelled out in dots and dashes of the Morse code. Fig. 7 shows the exact shape of the conducting areas on the code drum which form these letters.

Assuming for the sake of illustration that as the code drum rotates there is a drop in pressure. If the pressure is such that the contact point is following the path indicated by the line 72 and as it reaches the point indicated at 74 the pressure decreases causing the point to move from the dot which represents letter "E" to the last dot of the two dots which represent the letter "I," the signal which will be generated will be two dots being comprised of the dot of the E and the last dot of the I. Thus the signal received will be two dots for the letter "I." This will indicate the correct position of the contact point, the signal being correct even though the contact has changed positions in the middle of the letter.

To further explain this, the area, Figs. 6 and 7, which illustrates the code signals, may be thought of as divided into four zones numbered 76, 78, 80, and 82, each one containing one-quarter of the symbol which forms the entire letter. For example, with the letter "N," the zone 76 contains half of the dash, the zone 78 contains the other half of the dash, and the zone 80 contains the dot; the zone 82 containing a blank. The conducting areas are so shaped that when movements occur from one letter to the adjacent letter between zones, the letter formed will be one of adjacent letters. Of course, in actual operation changes in letters will not occur exactly between zones but with the conducting areas being continuous, as illustrated in Fig. 7, the code letter generated will be either of the adjacent letters and the illustration showing change exactly between zones is for purposes of ease of illustration only.

As another illustration of the contact point changing its position along the code drum during the time a letter is being generated, Figs. 6 and 7 illustrate the contact point moving along the path 76. As it reaches the midpoint of the letter, it jogs over from the letter "N" to the letter "D" having generated the first part of the letter "N" which is a dash. This is also the same as the first portion of the letter "D." As it jogs over, it catches the two dots of the letter "D" completing the letter, and the code symbol which will have been generated will be the dash and two dots which is the letter "D." Thus the correct letter is generated although the contact point has shifted in the middle of the letter.

Again the same may be illustrated if a shift is made in the latter one-quarter of the letter. This is illustrated if the contact point is moving along the path indicated in Figs. 6 and 7 by the number 78. The letter begins by generating the two dots which are the first portion of the letter "U" and starts into the dash which is the latter portion of the letter "U." As it leaves the dash portion of the letter "U" and moves on to the dash portion of the letter "A," the contact point will remain in continuous engagement with the conducting area because of the continuous nature of the conducting area as illustrated in Fig. 7. Thus the letter which will be generated will consist of two dots followed by a dash which will be the letter "U," this being the letter which the point has just left. The code letter generated then will be the letter which was just left and the error will be only one letter in magnitude. Actually since the conducting point changed in the latter part of the code letter, the "U" is a more accurate reading than the "A." In any event the error is only one letter and is so small that it may be ignored. As shown by the illustrations of the changes of the paths 72, 76 and 78, the conducting point may shift over into the adjacent letter at any point in its travel and the letter which will be generated will be one of the adjacent letters; either the succeeding letter or the previous letter just left. Thus the error in the signal generated is negligible, and there is no opportunity for an erroneous signal to be formed.

To accomplish this, the adjacent symbols are specifically chosen for their dot and dash content. By dividing the letters into their first and second half or into zones 76 and 78 as compared with 80 and 82, it will be noted that as each adjacent letter is changed, only the first or the last half of the letter is changed and the other half remains the same. For example, as we move from "D" to "M," the first portion of the letter remains the same, each having a dash; the latter portion is changed from the two dots to a dash. Any change which is made in adjacent letters may be resolved as follows: only half the letter is changed, the half of the letter which is changed, if it is a dash, is changed to two dots or vice versa, if it is a single dot, it is changed to two dots or a blank.

Figs. 8 and 9 are shown to illustrate that the proper signal will be formed even though the contact point changes from one letter to the adjacent letter moving from right to left. The path 84 of the contact point in Figs. 8 and 9 changes from the letter "I" to the "E" in the first quarter of the letter. Only one dot is generated which is the letter "E" and the point moves on to the blank space of "E." Thus the correct letter is generated even though the contact point has moved while it is generating the letter.

Path 86 changes when the contact point is half way through letter "D." As the point moves to "N" it generates a dot. The total signal generated is a dash and one dot or the letter "N" which is the correct letter.

The path of the contact point 88 changes three-quarters of the way through the letter. In this case the signal generated is a dash which is read as a "T." Thus in all cases the letter generated is one of the adjacent letters.

In many cases the symbol generated will be correct even though the contact point moves over more than one letter while generating the letter. Thus, however, will be an unusual case since the calibration of the instrument should be such that the movements of the arm will be no more than one letter during a rotation of the drum. If large movements are anticipated, the letters should be enlarged so that movements would still be only from one letter to the next in one revolution. Of course mechanical linkage may be provided so that only small movements of the arm and its contact point will occur.

An illustration of a use of the apparatus shown is given in Fig. 5, wherein the instrument is calibrated for use in a balloon. The graph shown therein illustrates altitudes up to 10,000 feet, a change in code letter being made for each 250 feet of rise. In such a use, the ascent of the balloon would not be so rapid that the change in position of the contact point would be more than one letter during the time the code drum rotates one revolution. It will be noticed from the graph of Fig. 5 that an extremely fine calibration can be obtained with the change of signals occurring every 250 feet. Thus the calibration of the code drum can be such that it is more than adequate for the sensitivity of the pressure responsive apparatus.

It will thus be recognized that the telemetering device which is provided, is extremely accurate, and meets the objectives set forth in the beginning of the specification. The apparatus is practical in numerous applications where the telemetering device is required and an electrical signal is to be generated in response to a mechanical displacement.

The device is small, requires little power to operate, and is notably rugged. Since the contact point bears on the contact surface with a very small pressure, and the contact surface can be made of hard materials, the wearing life of the apparatus can be extended for an extremely long period. Because the contact areas are made in sizable blocks, the small wear which might occur at the edges will make virtually no difference in the code symbol generated.

I have, in the drawings and specification, presented a detailed disclosure of the preferred embodiment of my invention. It is to be understood that the inventon is susceptible to modification in structural changes in various applications which are within the spirit and scope of the invention. I therefore do not intend to limit the invention to the specific form disclosed, but intend to cover all modifications, changes, and alternative constructions and methods falling within the scope of the teachings of my invention.

I claim as my invention:

1. In a device for telemetering code signals to indicate measurements which has a moving cylindrical code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the arrangement of long and short signals varying in a certain sequence as the contact member moves across the surface so that the telemetering signal will be indicative of the position of the contact member, the complete sequence forming a group and the group being repeated so that the entire sequence is repeated in an axial direction as the contact continues to move across the surface, and an aidditional identifying code letter for each group of letters, the group identifying letters being different for each group and spaced circumferentially from said axially repeated groups.

2. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the letters generated being different as the contact moves across the non-conductive surface, and the different letters being in a certain sequence which forms a group, each adjacent group across the non-conductive surface having said sequence of letters in reverse.

3. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the letters divided into a fore and after portion, the fore portion of each formed by a conductive area which is a part of a larger area serving as the fore portion of other letters, the after portion formed by a conductive area which is a part of a larger after area, serving as the after portion of other letters.

4. A device for telemetering according to claim 3, in which the adjacent code letters are changed by changing the shape of only the fore or after conductive area.

5. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the code letters changing as the contact moves across the carrier, the conducting areas which form the code letters having a fore and after portion, and only the fore portion or after portion changed from one letter to the next with the remaining portion staying the same.

6. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conducting areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the code letters arranged in groups each formed of a sequence of letters, the letters divided into a fore and an after portion, one conducting area which forms the letters serving the fore portion of the letters of a first group and an adjacent group, another conducting area serving the after portion of the letters of said first group and another adjacent group.

7. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the conducting areas arranged so that when the contact moves across the non-conductive surface from a first letter to the adjacent letter while generating a letter, the letter formed of the combined fore portion of the first letters and the after portion of the adjacent letter will be one of said letters thus eliminating the chance for error.

8. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, the long and short signals forming international Morse code letters in a sequence across the non-conductive surface forming the Morse code sequence E I S N D M A U T, this sequence being such that a shift of the contact member from a first letter to the adjacent letter while forming said first letter will form one of said letters thus eliminating telemetering an erroneous letter.

9. In a device for telemetering code signals to indicate measurements which has a moving code carrier with a non-conductive surface with conductive areas exposed, a contact arranged to bear on the surface and complete a telemetering circuit when it contacts said areas, means for moving the code carrier relative to the contact to carry said conductive areas past the contact, means responsive to a measurement for moving the contact member across the area and positioning it in accordance with the measurement, a telemetering circuit for transmitting the measurement to a remote location creating a signal when the contact member is in contact with one of the conducting areas, the improvement comprising having the conductive areas arranged in long and short lengths parallel to the relative path of movement of the code carrier to generate long and short signals to form code letters identifying the position of the contact, with a sequence of different letters across the surface, the letters being formed of a fore and after portion, each one of the successive fore or after letter portions being changed by a dash being adjoined by another dash or by two dots, a dot being adjoined by two dots or by a vacancy, and two dots being adjoined by a dash or by one dot, with the other portion of the successive letter unchanged.

10. A telemetering device according to claim 9 in which the letters are arranged so that there is no vacant space between them so that the signal will be continuous as the contact member moves from one letter to another.

References Cited in the file of this patent

UNITED STATES PATENTS

| | | |
|---|---|---|
| 2,207,743 | Larson et al. | July 16, 1940 |
| 2,466,099 | Hansen | Apr. 5, 1949 |
| 2,588,102 | Forero | Mar. 4, 1952 |

FOREIGN PATENTS

| | | |
|---|---|---|
| 134,018 | Great Britain | Oct. 22, 1919 |